United States Patent
Choi

(10) Patent No.: US 9,618,764 B2
(45) Date of Patent: Apr. 11, 2017

(54) 3D OBSERVATION DEVICE WITH GLASSLESS MODE

(71) Applicant: Hae-yong Choi, Seoul (KR)

(72) Inventor: Hae-yong Choi, Seoul (KR)

(*) Notice: Subject to any disclaimer, the term of this patent is extended or adjusted under 35 U.S.C. 154(b) by 58 days.

(21) Appl. No.: 14/625,993

(22) Filed: Feb. 19, 2015

(65) Prior Publication Data

US 2015/0261005 A1 Sep. 17, 2015

(30) Foreign Application Priority Data

Mar. 11, 2014 (KR) ........................ 10-2014-0028487

(51) Int. Cl.
*G03B 21/20* (2006.01)
*G02B 27/26* (2006.01)
*G02B 27/28* (2006.01)
*G02B 27/22* (2006.01)

(52) U.S. Cl.
CPC ......... *G02B 27/26* (2013.01); *G02B 27/2235* (2013.01); *G02B 27/2264* (2013.01); *G02B 27/283* (2013.01); *G03B 21/2073* (2013.01)

(58) Field of Classification Search
CPC G02B 27/2235; G02B 27/2264; G02B 27/26; G02B 27/283; G03B 21/2073
See application file for complete search history.

(56) References Cited

U.S. PATENT DOCUMENTS

| 3,891,313 | A * | 6/1975 | Murphy | G03B 35/20 352/60 |
| 2006/0109753 | A1* | 5/2006 | Fergason | G02B 27/26 369/30.01 |
| 2007/0285774 | A1* | 12/2007 | Merrirt | G02B 27/26 359/465 |

FOREIGN PATENT DOCUMENTS

KR   20-1964-0000749   4/1964

* cited by examiner

*Primary Examiner* — Sultan Chowdhury
*Assistant Examiner* — Magda Cruz
(74) *Attorney, Agent, or Firm* — Bacon & Thomas, PLLC

(57) ABSTRACT

A 3D observation device with glassless mode, where an observation hole in which two polarization plates having different polarization directions are arranged left/rightward and a monitor on which an image for a left eye and an image for a right eye are connected to form a 3D image box. The vertical rotation axis are provided on both left and right surfaces of the 3D image box and the vertical rotation bars that are linked with the rotation axis, and a support bar is provided on a lower part of the vertical rotation bar. Further, a viewer can view separately with glassless mode an image for a left eye through a left polarization plate of the observation hole and an image for a right eye through a right polarization plate of the observation hole in which the image for a left eye and the image for a right eye are overlapped.

14 Claims, 13 Drawing Sheets

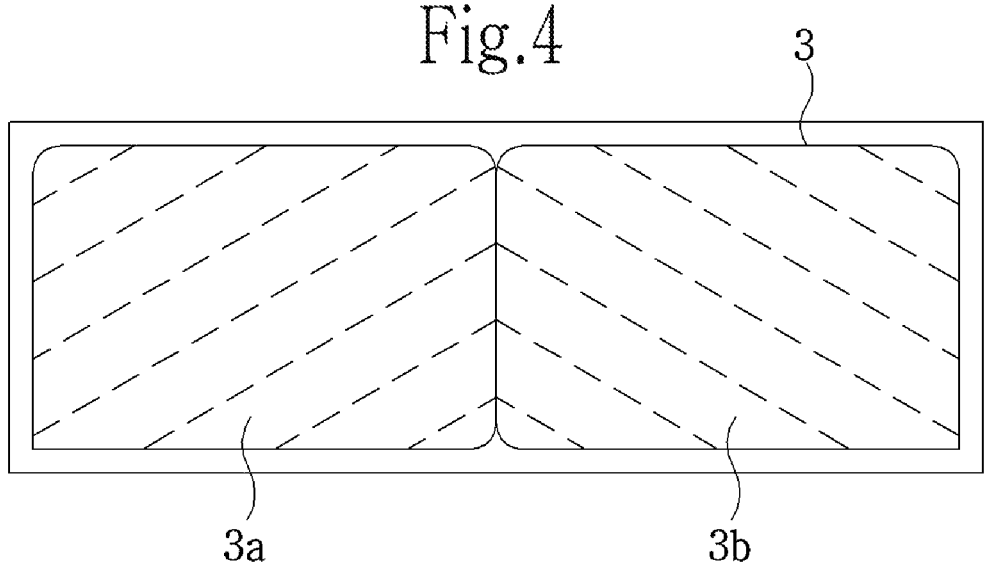

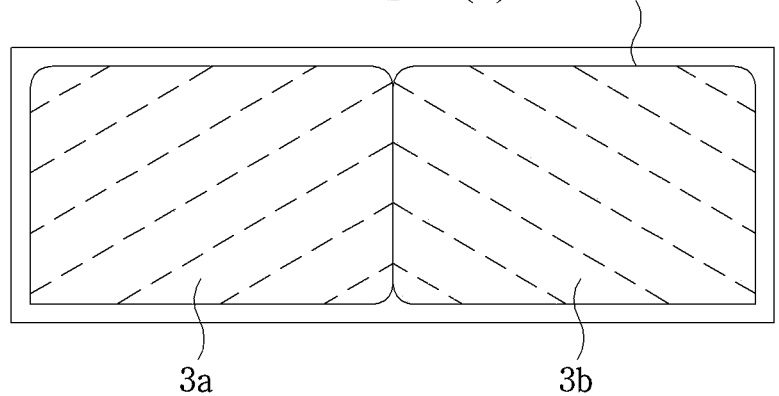
Fig.5(a)
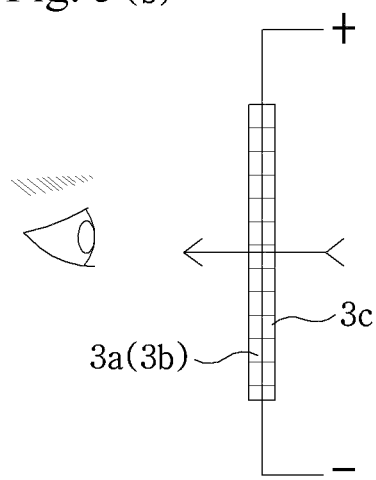 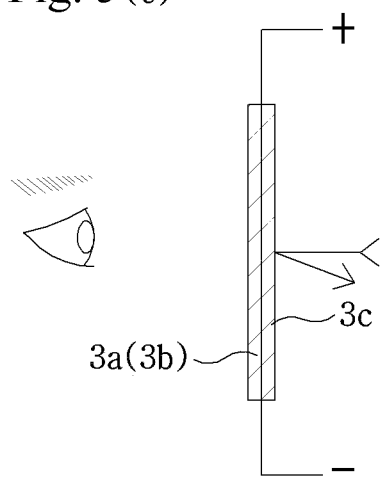
Fig. 5(b)　　　　　Fig. 5(c)

3D OBSERVATION DEVICE WITH GLASSLESS MODE

CROSS-REFERENCE(S) TO RELATED APPLICATION

This application claims under 35 U.S.C. §119(a) the benefit of Korean Patent Application No. 10-2014-0028487 filed on Mar. 11, 2014, which is incorporated by reference herein in its entirety.

BACKGROUND OF THE INVENTION (a) Field of the Invention

The present invention relates to a 3D observation device with glassless mode, and more particularly, to a 3D image observation device with glassless mode through which an individual can observe various 3D images such as a tourist site 3D image, a 3D movie trailer, a 3D game image and the like at a tourist site, museum, theater, hotel lobby, airport, game device and the like wherein a view sight of a picture is varied according to a viewing direction of the 3D image so that a viewer can observe a virtual reality with glassless mode.

(b) Description of the Related Art

In general, according to a related art of a 3D observation device that has been used at a tourist site or a museum, a left image is observed through a left lens and a right image is observed through a right lens through a magnification lens. However, according to this magnification type of a lens, a 3D image can be observed when the centers of a left and right eyes and pictures for the left and right eyes are disposed on a same axle, and thus the size of the picture needs to be within 65 mm as an interval between a left eye and a right eye.

Further, according to a conventional 3D image observation mirror, a left image and a right image are magnified through a left lens and a right lens, respectively, to be viewed, and thus the picture of 3D image needs to be within 65 mm of the interval between a left eye and a right eye of a human and a 3D image of 65 mm or more is impossible to be reviewed.

Accordingly, the images of smaller size within 65 mm of the interval between a left eye and a right eye regarding slide, picture, paintings and the like can be reviewed within a limited eye view sight angle.

Additionally, when a person views a 3D image through a monitor, he/she needs to use a polarization-type eyeglass or shutter-type eyeglass and thus the eyeglasses have to be provided separately to the viewers, causing inconvenience and increasing cost of eyeglasses.

REFERENCES OF THE RELATED ART (Patent Document 1) Korean Utility Model Application No. 20-1964-0000749

The description provided above as a related art of the present invention is just for helping in understanding the background of the present invention and should not be construed as being included in the related art known by those skilled in the art.

SUMMARY OF THE INVENTION

The present invention has been proposed to solve the above drawbacks and one object of the present invention relates to provide a 3D image observation device with a glassless mode which can provide the 3D image on a large picture as four times or more as a conventional picture of 65 mm on which various electronic contents are displayed. Further, a viewer can see the 3D image without a separate 3D eyeglass through the 3D image observation device of the present invention and a weight of a 3D image box is easily controlled such that an observation angle of the viewer can be easily adjusted according to a height of the viewer. That is, as a monitor inside the 3D image box for providing a 3D image becomes large, its weight increases and thus a user can move easily the 3D image box according to heights of eyes of a viewer or for comfort viewing posture.

Further, according to the 3D observation device with glassless mode of the present invention the 3D image box can be rotated so that the view sight angle can be varied according to a viewing angle.

According to an aspect of the present invention, an observation hole provided with two polarization plates having polarization directions that are symmetrical left/rightward and a monitor are connected to form a 3D image box, and a vertical rotation axis are provided on both left and right surface of the 3D image box and a support bar is provided on a lower part of the rotation axis.

According to another aspect of the present invention, a monitor for a 3D image a diagonal line of which is 30 cm-1 m (12"-40") may be provided inside the 3D image box, and an image for a left eye and an image for a right eye are displayed doubly on one screen.

According to still another aspect of the present invention, a left polarization plate is provided on a left side and a right polarization plate is provided on a right side based on a center line of the observation hole at a front surface of the 3D image box.

Accordingly, the image for a left eye is incident into a polarization plate in a left polarization direction (or a right polarization angle) of the polarization plates of the observation hole to enter into a left eye (or a right eye) of a viewer, and the remaining image for a right eye is incident into a polarization plate in a right polarization direction (or a left polarization angle) of the polarization plates of the observation hole to enter into a right eye (or a left eye) of a viewer.

According to yet another aspect of the present invention, the 3D image box may be configured with various screens or monitors for displaying electron image such as LED, LCD, PDP and projector so as to provide the image on line through DVD, VOD or other electronic recording media and the 3D image box may be connected to optical devices.

In more detailed description, two polarization plates having different polarization directions are arranged left/rightward on the observation hole, and the observation hole is connected to a monitor on which an image for a left eye and an image for a right eye are displayed doubly to form the 3D image box.

Here, the vertical rotation axis are provided on both left and right surface of the 3D image box and the vertical rotation bars are linked with the vertical rotation axis.

According to still yet another aspect of the present invention, the buffering device may provided between the 3D image box and the vertical rotation bar such that even old man can operate the 3D image box without much effort.

According to further aspect of the present invention, the front plate is provided on a front surface of the 3D image box, in which upper, lower, left and right frames are opened and closed for replacing paintings.

According to a further aspect of the present invention, a coin machine, a banknote recognizer or a card recognizer may be provided on one surface of the 3D image box to be linked with the monitor.

According to another further aspect of the present invention, a location sensing device provided with a gyroscope sensor, an acceleration sensor, a GPS module or the like may be provided such that a viewer can observe the 3D image that is at a rotated view sight angle according to the rotated 3D image box.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 4 is a view illustrating a configuration of a polarization observation hole according to an embodiment of the present invention;

FIGS. 5 (a), (b) and (c) are views illustrating configurations of a polarization observation hole in a shutter type of the 3D observation device according to an embodiment of the present invention, respectively;

Figure 1:
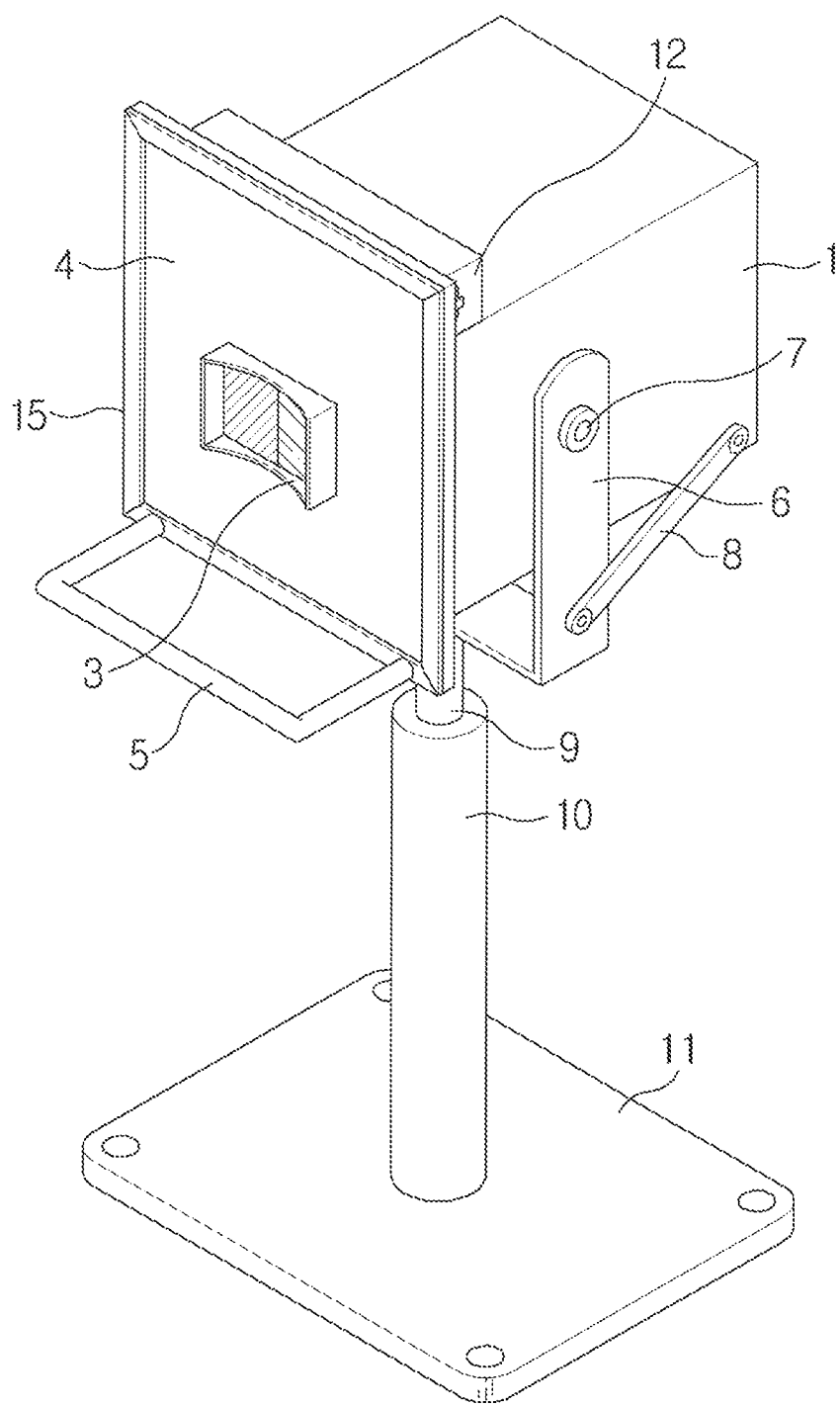
FIG. 1 is a perspective view illustrating a 3D observation device with glassless mode according to an embodiment of the present invention.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Exemplary embodiments of the present invention will be described below in detail with reference to the accompanying drawings. Wherever possible, the same reference numerals will be used to refer to the same elements throughout the specification, and a duplicated description thereof will be omitted.

Figure 2:
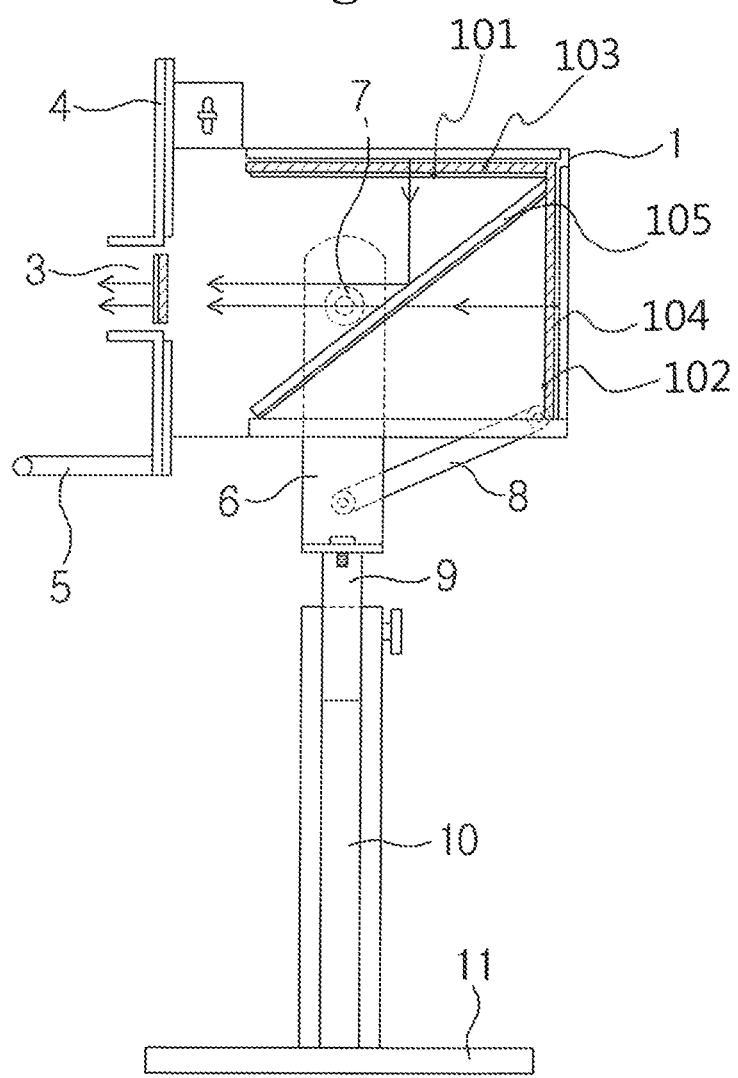
FIG. 2 is a cross-section view illustrating a 3D observation device with glassless mode according to an embodiment of the present invention.

As shown in FIGS. 1 and 2, a 3D observation device according to an embodiment of the present invention is provided with an 3D image box 1 wherein a rotation axis 7 around which the 3D image box is rotated vertically is provided on external middle points of left and right sides of the 3D image box. That is, the 3D image box 1 is rotated vertically around the rotation axis 7.

Meanwhile, a rotation bar 9 for rotating left/rightward the 3D image box is provided on below the 3D image box 1, which is connected to a support bar 10, and a handle 5 is provided on a front and lower side of the 3D image box such that the 3D image box 1 is rotated vertically and horizontally through the correlation of the rotation axis 7, the rotation bar 9, the support bar 10 and the handle 5. Meanwhile, an observation hole 3 is provided on a front of the 3D image box 1 and further a viewer can move the observation hole 3 to a location convenient for observing the image by using the correlation of the rotation axis 7, the rotation bar 9, the support bar 10 and the handle 5.

As shown in FIGS. 2, 6(a), 7(a), 8(a), 9(a), 10(a), 11(a) and 12(a), a screen 2 is provided on inner rear side of the 3D image box 1, which consists of a monitor on which an image for left eye and an image for right eye of a 3D image are displayed to be overlapped, and an observation hole 3 is formed at a central location of a picture of a 3D image monitor on a front of the 3D image box 1. Further, a front plate 4 on which an advertisement can be attached is provided on a front of the 3D image box 1, through which various 3D image providing programs are advertized.

Here, a 3D image can be provided to the screen 2 through an electronic record media such as DVD, VOD, internet, setup box or the like, or an image providing device 12 of a small computer, and the screen 2 is configured as a monitor of LED, LCD, PDP and a projector on which electronic image can be displayed.

Meanwhile, a picture size of the screen 2 is not limited; however, it recommends that a diagonal size thereof is 30 cm-1 m (12"-40") as a large size.

The image providing device 12 may use a setup box for driving various image media, a small computer, DVD, USB and the like and be connected to a proper location of the 3D image box.

Further, a recognizer 14 for recognizing a banknote and card, the screen 2 and the image providing device 12 are connected through a power switch and a viewer can view a 3D image selected among various 3D images for a predetermined time using a timer device.

As shown in FIGS. 1 and 2, a buffering device 8 may be provided at a proper location between the 3D image box 1 and an upper and lower rotation bar as a plurality. The buffering device 8 may use a gas spring, air spring, an air cylinder or the like. Here, the gas spring or the air spring is configured differently from a general spring such that a rod is pushed into a tube so that there is no difference in force even at a long stroke and speed control, impact dampening effect, flat repulse force diagram and repulse force effect in various ranges can be obtained.

The buffering device 8 provided with the air spring is arranged on one of the vertical rotation axis 7 of the 3D image box 1, the horizontal rotation bar 9 around which the vertical rotation axis 7 is rotated is provided on a lower part of the vertical rotation axis 7, the support bar 10 for rotating the 3D image box 1 is provided at a lower part of the horizontal rotation bar 9 and a bottom fixing plate 11 is provided at a lower part of the support bar 10.

Here, the gas spring is used as an effective way for offsetting an interval between opening and closing holes for a heavy article and serves to raise and lower a heavy article. That is, a user may move the 3D image box 1 that is moved vertically to match with an eye height of the user by using the vertical rotation axis 7 with a handle on a surface of the 3D image box 1 and the 3D image box 1 stops at the moved location. That is, the 3D image box 1 is moved vertically and stops within the moved angle and thus a user may use conveniently the 3D image box.

Air is injected into the buffering device 8 and the 3D image box 1 is fixed automatically at a random location by the buffering device 8 that is linked with the vertical rotation axis 7 even though a monitor of the 3D image box 1 becomes large and is-weighted heavily wherein a user may move vertically the 3D image box 1 with the handle 5.

As the 3D image box 1 is rotated vertically and horizontally, for example, when it goes forwardly under a virtual experience, only the 3D image corresponding to a front surface is provided, and when the 3D image box is rotated horizontally, the 3D image corresponding to left and right view sight angles is provided through the operation of gyroscope sensor and acceleration sensor and thus it is useful for experiencing a virtual experience game or virtual experience 3D device.

Further, when the 3D image box moves under the operation of GPS module, the 3D image corresponding to the moving location can be viewed.

That is, when the 3D image box 2 of the present invention moves, the moving picture corresponding to the moving of the 3D image box is displayed on the 3D image box through the sensing operation of GPS module.

As shown in FIG. 4, the observation hole 3 is configured such that a left polarization plate 3a and a right polarization plate 3b are provided left/rightward on one observation hole 3 wherein the polarization directions of the left polarization plate 3a and the right polarization plate 3b are different.

For example, when the polarization direction of the left polarization plate 3a is 45° at a left direction, the polarization direction of the right polarization plate 3b is 45° at a right direction.

Meanwhile, a polarization angle of a polarization plate provided on a front of an image monitor for a right eye is identical to a polarization angle of a polarization plate provided on a front of an image monitor for a left eye on the screen 2 such that the image for a right eye on the monitor for a right eye is transmitted only through the right polarization plate 3b of the observation hole 3 and blocked from the left polarization plate 3a and the for a left eye on the monitor for a left eye is transmitted through the left polarization plate 3a and blocked from the right polarization plate 3b.

According to another embodiment of configuring the observation hole 3 of the present invention, as shown in FIG. 5, a liquid crystal is provided between two polarization plates such that a left observation hole 3c and a right observation hole 3d are opened and closed alternatively and instantly at a time interval of 1/24 second or 1/48 second, respectively.

In this case, the image for a left eye and the image for a right eye are displayed in sequence of left and right directions at a time interval of 1/24 second or 1/48 second on the screen 2 wherein only when the right image is displayed on the screen 2, a person views the image through the right observation hole, and only when the left image is displayed on the screen 2, a person views the image through the left observation hole.

As shown in FIG. 2, according to one configuration of the 3D image box 1 of the present invention, a left polarization plate 101 and a right polarization plate 102 are provided on one of an upper surface and a lower surface and a rear surface, respectively, a left monitor 103 and a right monitor 104 are arranged at an right angle and a half-transparent mirror 105 that transmits a part of the image and reflect a part of the image is arranged to be inclined at an angle of 45° between the left monitor and the right monitor at a location of the observation hole 3.

According to another configuration of the 3D image box 1 of the present invention, the left and right images are divided per respective pixel and a monitor for a 3D image which is prepared by providing polarization plates on a surface of left image of a pixel unit and a surface of right image of a pixel unit, respectively, is connected to the observation hole 3.

Here, the 3D image box 1 is formed with the observation hole 3 prepared as a left-right in sequence shutter type and a monitor on which the left and right images are displayed in sequence.

According to further another configuration of the 3D image box 1 of the present invention, a left image projector and a right image projector are provided and polarization plates are arranged on front surfaces of projection lens of the left image projector and the right image projector, and a screen is arranged on a front surface of the 3D image box to be connected to the observation hole 3.

According to still another configuration of the 3D image box 1 of the present invention, it is configured such that an image for a left eye and an image for a right eye among 3D images are projected in sequence on a screen from a projector, and is connected to the observation hole 3 in a shutter glass type. Detailed descriptions of the embodiments are as follows.

[Embodiment 1]

Figure 6:
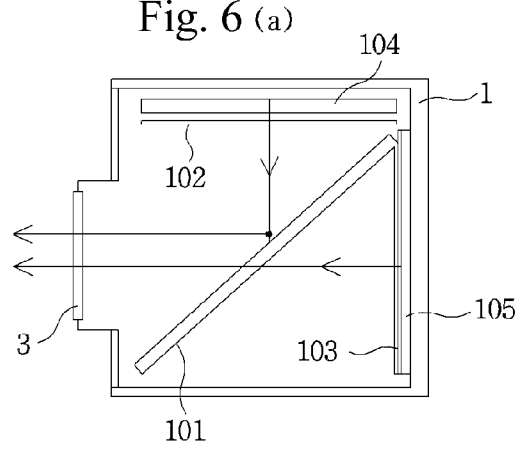
FIGS. 6 (a) and (b) are views illustrating configurations of the observation hole and a 3D image box of the 3D image observation device according to a first embodiment of the present invention.
Figure 6:
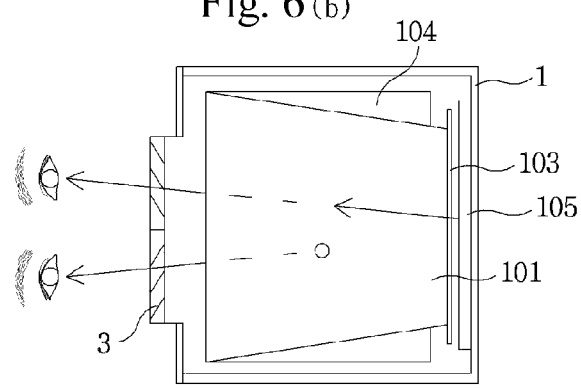

The 3D image box 1 as shown in FIG. 6 is configured as follows.

FIG. 6(*a*) is a side view illustrating the 3D image box of the present invention and FIG. 6(*b*) is a bottom view illustrating the 3D image box. Referring to FIGS. 6(*a*) and 6(*b*), a left monitor 104 and a right monitor 105 are arranged at a right angle on one surface of the upper and lower surfaces and a rear surface inside the 3D image box 1, and a half-transparent mirror 101 is arranged to be inclined at 45° between the left monitor 104 and the right monitor 105, through which a part of the image is transmitted and a part of the image is reflected.

Here, a left polarization plate 102 and a right polarization plate 103 are provided on a front surface of the respective monitor wherein the polarization directions thereof are symmetrical or opposed. Further, the observation hole 3 is arranged on a front surface of the 3D image box 1. That is, according to Embodiment 1, it is featured to view directly 3D image with glassless mode through the 3D image box provided with the observation hole 3, the left monitor 104, the right monitor 105 and the half-transparent mirror 101.

[Embodiment 2]

Figure 7A:
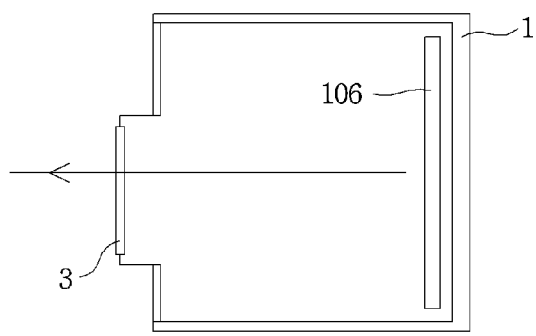
FIGS. 7 (a) and (b) are views illustrating configurations of the observation hole and a 3D image box of the 3D observation device according to a second embodiment of the present invention.
Figure 7B:
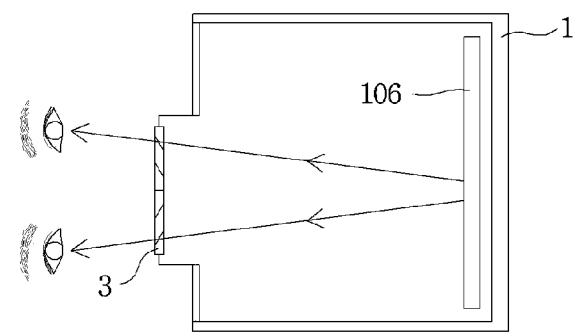

The 3D image box 1 as shown in FIG. 7 is configured as follows.

FIG. 7(*a*) is a side view illustrating the 3D image box of the present invention and FIG. 7(*b*) is a bottom view illustrating the 3D image box. Referring to FIGS. 7(*a*) and 7(*b*), the monitor 106 for a 3D image is configured such that the left and right images are divided per respective pixel and polarization plates are provided on surfaces of left image of a pixel unit and right image of a pixel unit, respectively, wherein the polarization directions of the polarization plate for a left image and the polarization plate for a right image are directed left/rightward differently per pixel unit. Meanwhile, the observation hole 3 is arranged on a front surface of the monitor 106 for a 3D image, that is, on a front surface of the 3D image box 1.

[Embodiment 3]

Figure 8:
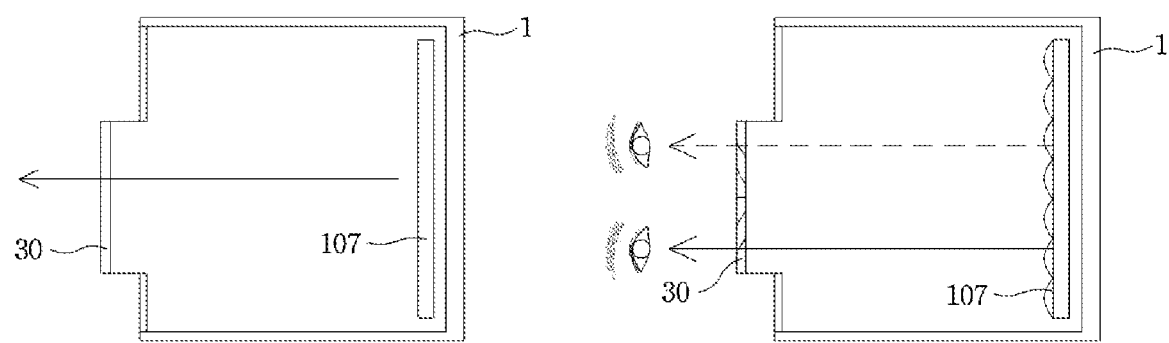
FIGS. 8 (a) and (b) are views illustrating configurations of the observation hole and an 3D image box of the 3D observation device according to a third embodiment of the present invention.

The 3D image box 1 as shown in FIG. 8 is configured as follows.

FIG. 8(*a*) is a side view illustrating the 3D image box of the present invention and FIG. 8(*b*) is a bottom view illustrating the 3D image box. Referring to FIGS. 8(*a*) and 8(*b*), a left image and a right image are displayed alternatively in sequence on a monitor 107 for a 3D image. For example, when a displaying time of a picture is ½4 second, the left image is displayed for ½48 second and the right image is displayed for ½48 second.

As shown in FIG. 5, a shutter observation hole 30 is configured such that a center line is arranged in a vertical direction of the shutter observation hole 30 and shutters are provided on a left and a right side based on the center line, respectively, and as shown in FIGS. 5(*a*) and 5(*b*), but it is not limited thereto, for example, the left surface 3*a* is opened and closed for ½48 second and the right surface 3*b* is opened and closed for ½48 second such that a shutter of the observation hole 3 at a location of a left eye is opened and closed when the left image is displayed on the monitor and a shutter of the observation hole 3 at a location of a right eye is opened and closed when the right image is displayed on the monitor.

[Embodiment 4]

Figure 9A:
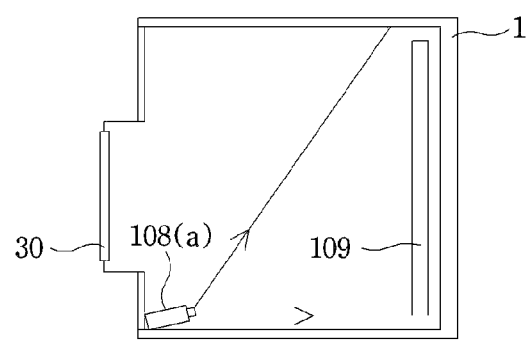
FIGS. 9 (a) and (b) are views illustrating configurations of the observation hole and an 3D image box of the 3D observation device according to a fourth embodiment of the present invention.
Figure 9B:
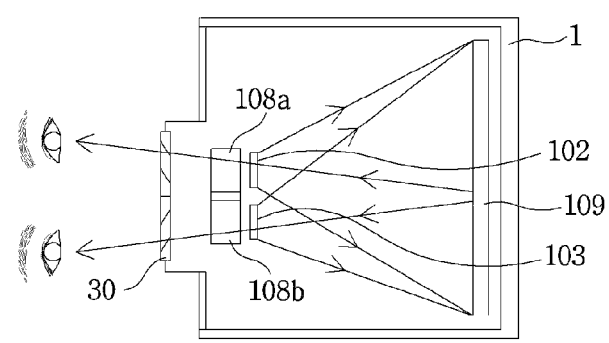

The 3D image box 1 as shown in FIG. 9 is configured as follows.

FIG. 9(*a*) is a side view illustrating the 3D image box of the present invention and FIG. 9(*b*) is a bottom view illustrating the 3D image box. Referring to FIGS. 9(*a*) and 9(*b*), a left polarization plate 102 and a right polarization plate 103 are arranged respectively on front surfaces of the projection lens provided on a left image projector 108*a* and a right image projector 108*b*, respectively, and the image is projected on the screen 2 that is disposed on a front surface of the 3D image box. That is, the image for a left eye is projected through the left image projector 108*a* and the image for a right eye is projected through the right image projector 108*b* wherein the images for a left eye and a right eye are projected through the left and right polarization plates 102, 103, respectively, the polarization plates being arranged symmetrically left/rightward, and thus the left image is incident into a left eye and the right image is incident into a right eye, thereby viewing a 3D image.

[Embodiment 5]

Figure 10A:
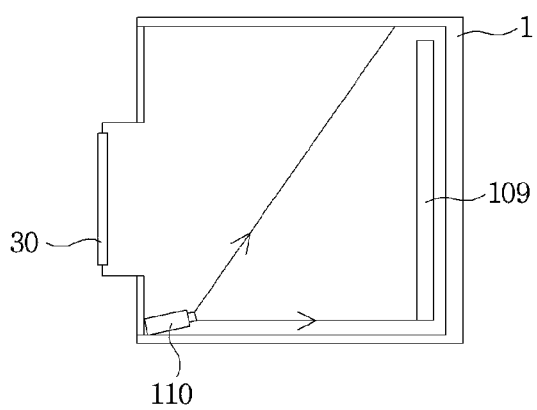
FIGS. 10 (a) and (b) are views illustrating configurations of the observation hole and an 3D image box of the 3D observation device according to a fifth embodiment of the present invention.
Figure 10B:
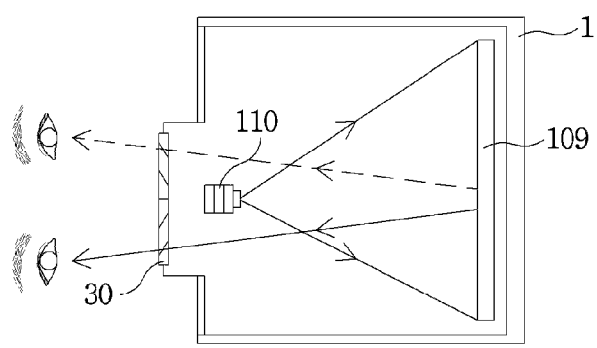

The 3D image box 1 as shown in FIG. 10 is configured as follows.

FIG. 10(*a*) is a side view illustrating the 3D image box of the present invention and FIG. 10(*b*) is a bottom view illustrating the 3D image box. Referring to FIGS. 10(*a*) and 10(*b*), a left image and a right image are projected in sequence at a time interval through one projector 110 as in Embodiment 3, and the shutter of the observation hole 30 is opened and closed in synchronization with the time interval of projecting the images such that a right glass of the observation hole is opened when the right image is projected on the screen 109 and a left glass of the observation hole is opened when the left image is projected on the screen 109. Accordingly, a viewer can view simultaneously the left image through a left eye and the right image through a right eye at a time interval thereby to view a 3D image.

[Embodiment 6]

Figure 11:
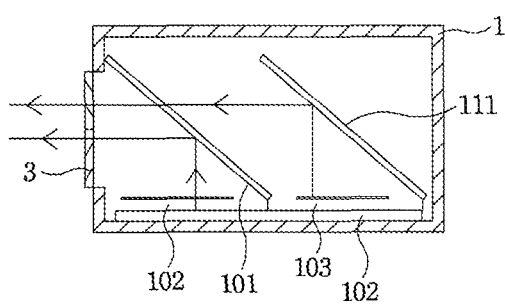
FIGS. 11 (a) and (b) are views illustrating configurations of the observation hole and an 3D image box of the 3D observation device according to a sixth embodiment of the present invention.
Figure 11:
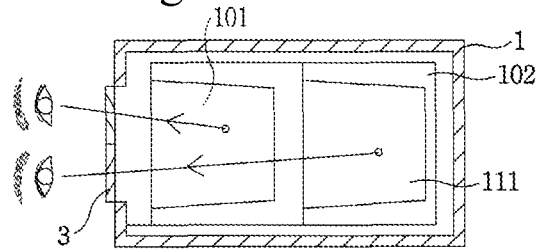

The 3D image box 1 as shown in FIG. 11 is configured as follows.

FIG. 11(*a*) is a side view illustrating the 3D image box 1 of the present invention and FIG. 11(*b*) is a bottom view illustrating the 3D image box. Referring to FIGS. 11(*a*) and 11(*b*), one monitor 102 is provided on a floor or a ceiling of the 3D image box and the monitor is divided into two parts based on a center line thereof wherein an image for a left eye is displayed on one part and an image for a right eye is displayed on the other part. Here, a left polarization plate 102 and a right polarization plate 103 which have a different polarization degree are provided on a front surface and further a reflection mirror 111 is arranged to be inclined at 45° at a rear end of the monitor and a half-transparent mirror 101 that transmits 50% of the image and reflects 50% of the image is arranged on a front end of the monitor. According to the configuration of the monitor as described in the forgoing, the image for a left eye(or the image for a right eye) at a rear end of the monitor 102 is refracted and reflected frontward at an angle of 90° from the reflection mirror 111 to transmit through the half-transparent mirror 101 and then it transmits through the left polarization plate (or the right polarization plate) of the observation hole 3. Meanwhile, the image for a right eye (or the image for a left eye) at a front end of the monitor 102 is refracted and reflected frontward at an angle of 90° from the half-transparent mirror 101 to be incident into the right polarization plate (or the right polarization plate) of the observation hole 3 so that a viewer can view simultaneously the left and right images thereby to view a 3D image.

[Embodiment 7]

Figure 12A:
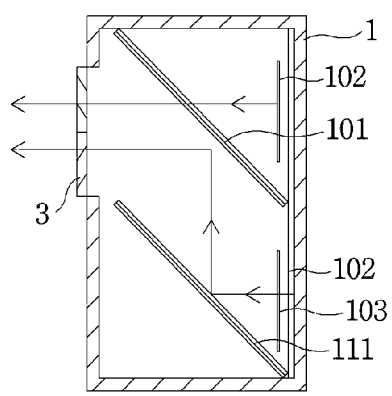
FIGS. 12 (a) and (b) are views illustrating configurations of the observation hole and an 3D image box of the 3D observation device according to a seventh embodiment of the present invention.
Figure 12B:
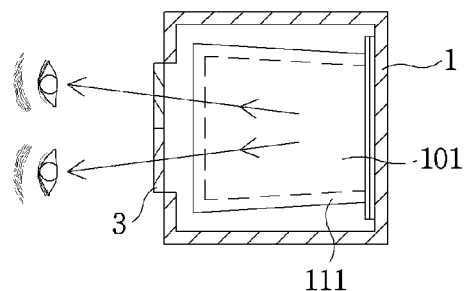

The 3D image box 1 as shown in FIG. 12 is configured as follows.

FIG. 12(*a*) is a side view illustrating the 3D image box 1 of the present invention and FIG. 12(*b*) is a bottom view illustrating the 3D image box. Referring to FIGS. 12(*a*) and 12(*b*), the principle of Embodiment 7 is the same as Embodiment 6, however, it is only different in that the monitor 102 is arranged horizontally in Embodiment 6 and the monitor 102 is arranged vertically in Embodiment 5. The technical constitutions of Embodiments 1 to 7 are featured such that the 3D image screen 2 and the observation hole 3 are connected to form a 3D image box 1 so that a 3D image can be viewed with glassless mode using the 3D image box.

Further, a size of the 3D image box is not limited but it is provided with a monitor for a 3D image having a diagonal line of 30 cm-1 m (12"-40") wherein an image for a left eye and an image for a right eye are displayed to be overlapped on one monitor or one screen and further the image for a left eye is incident into a polarization plate in a left polarization direction (or a right polarization angle) of the polarization plates of the observation hole 3 to enter into a left eye (or a right eye) of a viewer, and the remaining image for a right eye is incident into a polarization plate in a right polarization direction (or a left polarization angle) of the polarization plates of the observation hole 3 to enter into a right eye (or a left eye) of a viewer.

A recognizer 14 is provided on one surface of the 3D image box 1 to be liked with the operation of the screen 2. That is, a card recognizer 14 is provided on one surface of the 3D image box 1 to recognize a traffic card or a credit card.

Figure 13:
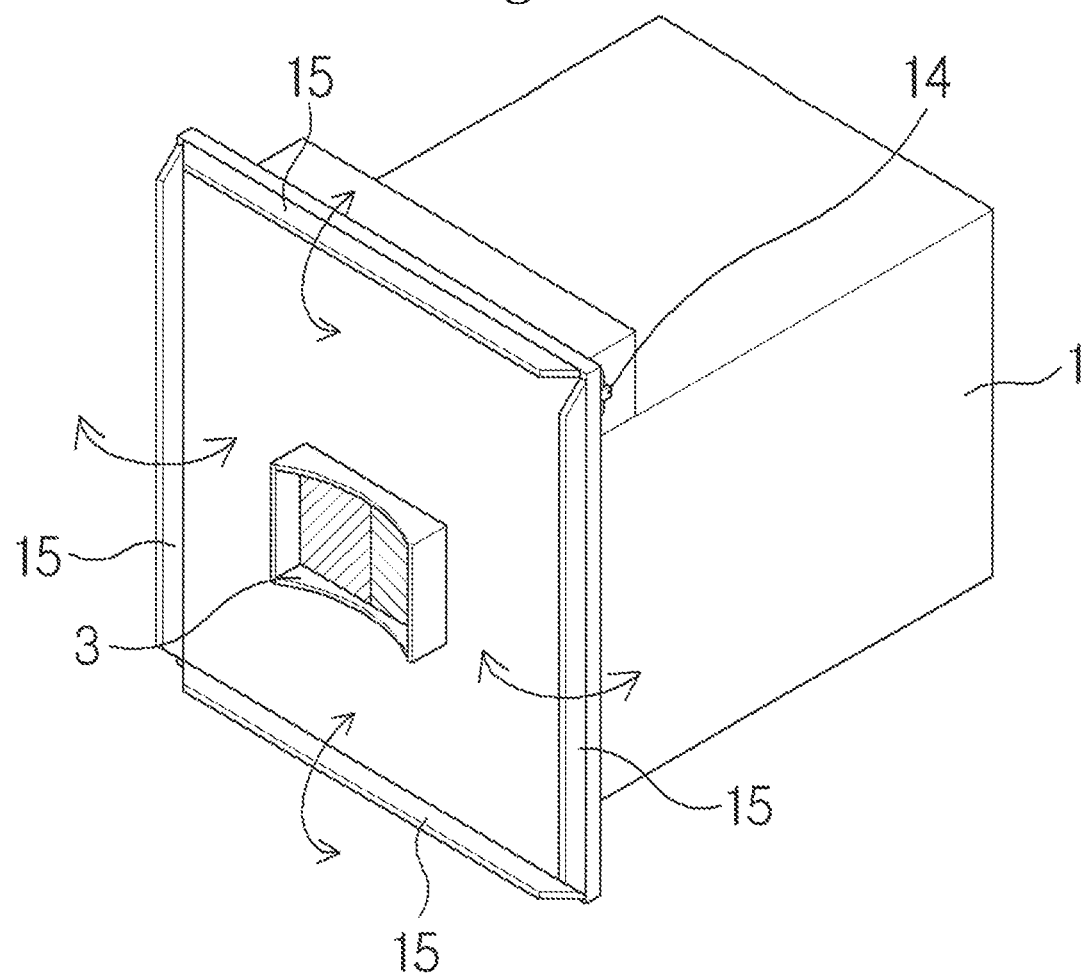
FIG. 13 is a view illustrating an upper, a lower, a left and a right frame of a front plate of the 3D image observation device, which are opened and closed, according to an embodiment of the present invention.

FIG. 13 is a view illustrating a 3D image observation device with glassless mode according to an embodiment of the present invention wherein a 3D image box 1 and a front plate 4 are separated. As shown in FIG. 13, the 3D image observation device with glassless mode is provided with a banknote recognizer 14.

Here, the banknote recognizer 14 is connected to a power source of a monitor and serves as a switch for the monitor when a coin, a banknote, a credit card, a traffic card or the like is inserted therein.

That is, when a viewer inserts electronic cash such as coin, banknote, credit card, traffic card or the like into the banknote recognizer 14, the power source is operated so that a viewer can view the image on the 3D image box 1.

Further, a location sensing device provided with a gyroscope sensor, an acceleration sensor, a GPS module or the like is arranged on the 3D image box 1 such that when the 3D image box moves, the image displayed on inner side of the 3D image box is magnified according to the moving angle or the moving image can be viewed.

That is, when the 3D image box is rotated vertically or horizontally, the gyroscope sensor, the acceleration sensor, the GPS module or the like recognizes the rotation such that a view sight of the 3D image is magnified toward the rotation direction of the 3D image box or the image is rotated so that a virtual effect can be obtained.

Figure 3:
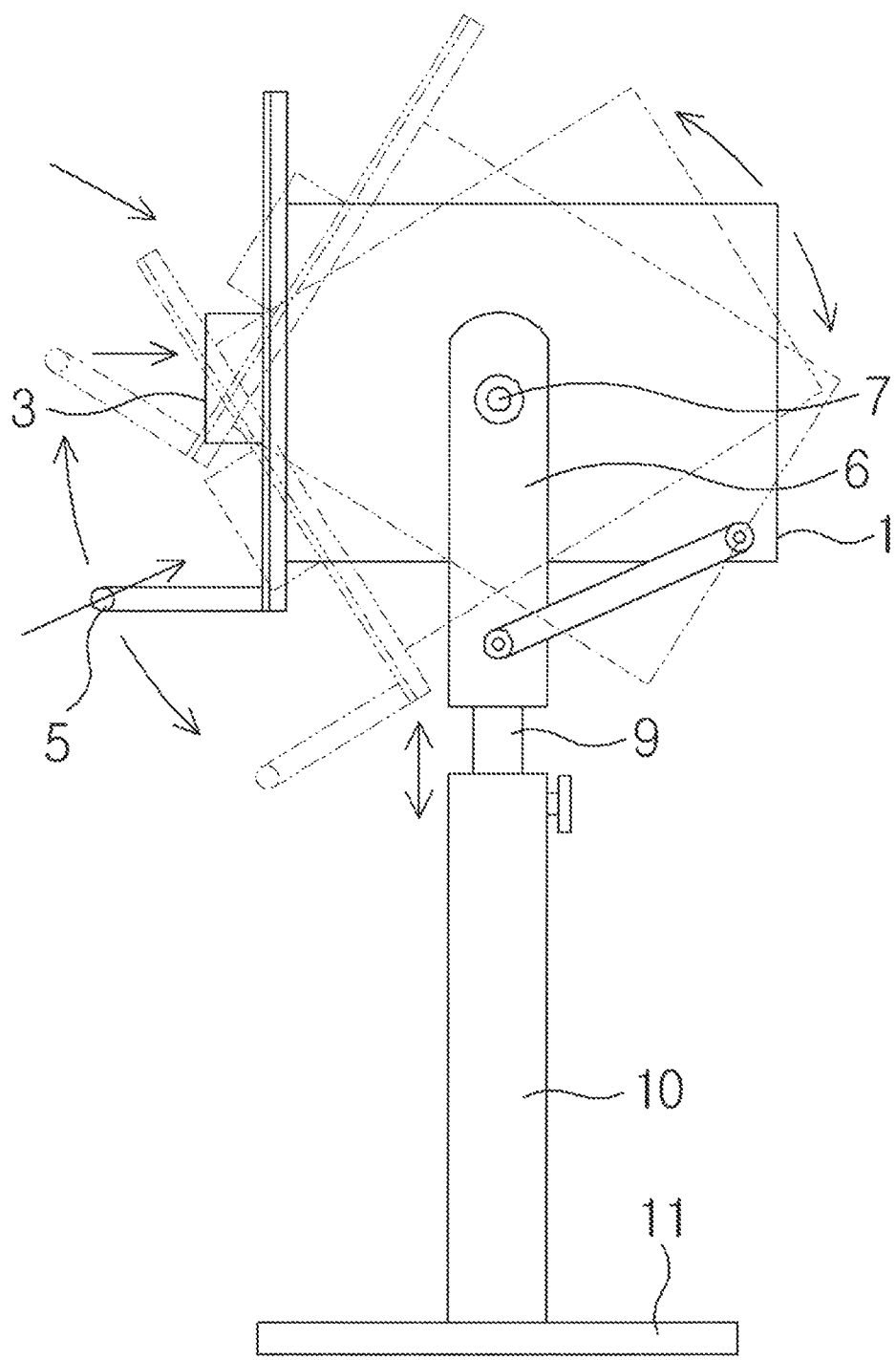
FIG. 3 is a view illustrating a 3D image box that is driven vertically by a buffering device according to an embodiment of the present invention.

That is, as described in the forgoing and shown in FIGS. 1 to 3, the 3D image box 1, the observation hole 3, the buffering device 8, the location sensor and the vertical rotation axis 7 are rotated simultaneously around the horizontal rotation bar 9 such that the 3D image box is rotated downward, upward, leftward, and rightward, respectively and is rotated simultaneously vertically and horizontally.

Here, a picture, a drawing, a using method or the contents of a 3D image provided can be printed on an upper part, a lower part, a left part or a right part of a front of the 3D image box, or a design or picture can be attached thereto and detached therefrom.

As shown in FIG. 13, the frames of the front plate 4 are opened and closed vertically and horizontally. The image to be displayed on the screen can be replaced using internet.

However, an advertizing printing such as poster to be attached to the front plate 4 needs to be replaced frequently. Considering this necessity, the poster formed with the printing can be replaced while the frame opening and closing device 15 is opened/closed.

Accordingly, a view can views a 3D image through a polarization plate having polarization angle that is symmetrical leftward/rightward so that a separate 3D image glass is not necessary. Accordingly, it is not necessary to give and collect separately a 3D image glass at an installation side of the 3D observation device such as tourist site, theater lobby, amusement park and the like, and further it saves cost occurred from using a disposable glass.

Further, a size of the monitor on which an image for a left eye and an image for a right eye of a 3D image that is supplied on line through DVD, VOD or other electronic recoding media device and computer is not limited, however, the diagonal line of the monitor can be 30 cm-1 m (12"-40") as a large picture which is as 20-140 times large as a conventional image provided having a size limitation to 65 mm.

Here, the image box for embedding the monitor through which a large picture a diagonal line of which is 30 cm-1 m (12"-40") is provided becomes heavy so that a user feels difficulty to operate it. Accordingly, the buffering device such as an air spring is connected between the image box and the vertical rotation bar so that a user can operate it simply and lightly.

According to the present invention, a user can rotate the 3D image box provided with a location sensor such as vertically and horizontally and such that the image is sensed through the operation of a gyroscope sensor, an acceleration sensor, a GPS module or the like and the image corresponding to the rotation angle of the 3D image box is displayed on the monitor.

Accordingly, the 3D image observation device with glassless mode can be installed at a tourist site, museum, theater, hotel lobby, airport, game device and the like and an individual can enjoy various 3D images such as a tourist site 3D image, a 3D movie trailer, a 3D game image and the like.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A 3D observation device with glassless mode for providing virtual reality 3D images to individual persons, comprising:
   left and right monitors arranged at a right angle to each other;
   left and right polarization plates provided on a front surface of the left and right monitor, respectively;
   a 3D image box in which a half-transparent mirror that reflects a part of the 3D images and transmits another part of the 3D images is arranged to be inclined at 45° between the left and right polarization plates;
   an observation hole provided with left and right polarization plates on one side of the 3D image box;
   a location sensor including a gyroscope sensor and an acceleration sensor that are provided on one end of the image box and configured to detect the 3D images at a view angle corresponding to a rotation angle of the 3D image box; and
   an up down rotation plate for rotating the 3D image box upward and downward and a left and right rotation plate for rotating the 3D image box leftward and rightward.

2. The 3D observation device with glassless mode of claim 1, wherein a recognizer for recognizing a bill or a card is provided on one side of the 3D image box.

3. A 3D image observation device with glassless mode for providing virtual reality 3D images to individual persons, comprising:

left and right projectors on each projection lens of which left and right polarization plates are provided for displaying virtual reality images;

an image box in which a screen is arranged on a front surface of the left and right projectors;

an observation hole provided with left and right polarization plates on one side of the image box;

a location sensor including a gyroscope sensor and an acceleration sensor that are provided on one end of the image box and configured to detect the virtual reality images corresponding to a rotation angle of the image box among the virtual reality 3D images displayed on the screen; and an up down rotation plate for rotating the image box upward and downward and a left and right rotation plate for rotating the image box leftward and rightward.

4. The 3D observation device with glassless mode of claim 3, wherein a recognizer for recognizing a bill or a card is provided on one side of the 3D image box.

5. A 3D image observation device with glassless mode for providing virtual reality 3D image to individual persons, comprising:

an image box on which an image for a left eye and an image for a right eye for 3D images are displayed, left and right polarization plates being provided on each front surface of the images for the left and right eye, wherein a half-transparent mirror that reflects a part of the image and transmits a part of the image is provided a front surface of the left polarization plate and a reflection mirror that reflects wholly the image is provided on a front surface of the right polarization plate;

an observation hole provided with left and right polarization plates on one side of the image box;

a location sensor including a gyroscope sensor and an acceleration sensor that are provided on one end of the image box and configured to detect the image corresponding to a rotation angle of the image box; and an up down rotation plate for rotating the image box upward and downward and a left and right rotation plate for rotating the image box leftward and rightward.

6. The 3D observation device with glassless mode of claim 5, wherein a recognizer for recognizing a bill or a card is provided on one side of the 3D image box.

7. A 3D image observation device with glassless mode for providing virtual reality 3D images to individual persons, comprising:

an image box in which a monitor for 3D images is provided, which separates pixels of the monitor displaying 3D images into an image for a left eye and an image for a right eye, where a left and a right polarization plate is provided on each front surface of the separated images for the left eye and the right eye;

an observation hole provided with left and right polarization plates on one side of the image box;

a location sensor including a gyroscope sensor and an acceleration sensor that are provided on one end of the image box and configured to detect the image corresponding to a rotation angle of the image box; and an up down rotation plate for rotating the image box upward and downward and a left and right rotation plate for rotating the image box leftward and rightward.

8. The 3D observation device with glassless mode of claim 7, wherein a recognizer for recognizing a bill or a card is provided on one side of the 3D image box.

9. A 3D image observation device with glassless mode for providing virtual reality 3D images to individual persons, comprising:

a projector for projecting sequentially an image for a left eye and an image for a right eye for 3D images;

an image box in which a screen for displaying the images from the projector is provided;

an observation hole configured in a left and right sequential shutter type such that the hole is opened/closed sequentially corresponding to the images for the left eye and the right eye from the projector on a front surface of the image box;

a location sensor including a gyroscope sensor and an acceleration sensor that are provided on one end of the image box and configured to detect the image corresponding to a rotation angle of the image box;

an up down rotation plate for rotating the image box upward and downward and a left and right rotation plate for rotating the image box leftward and rightward.

10. The 3D observation device with glassless mode of claim 9, wherein a recognizer for recognizing a bill or a card is provided on one side of the 3D image box.

11. A 3D image observation device with glassless mode for providing virtual reality 3D images to individual persons, comprising:

an image box in which a 3D monitor for displaying sequentially images for a left eye and images for a right eye is provided for the 3D images;

an observation hole configured in a left and right sequential shutter type such that the hole is opened/closed at same time-intervals as the images for the left eye and the right eye from the 3D monitor on a front surface of the image box;

a location sensor including a gyroscope sensor and an acceleration sensor that are provided on one end of the image box and configured to detect the image corresponding to a rotation angle of the image box;

an up down rotation plate for rotating the image box upward and downward and a left and right rotation plate for rotating the image box leftward and rightward.

12. The 3D observation device with glassless mode of claim 11, wherein a recognizer for recognizing a bill or a card is provided on one side of the 3D image box.

13. A 3D image observation device with glassless mode for providing virtual reality 3D images to individual persons, comprising:

an image box in which a 3D monitor for separating and displaying the electronic images such as LED, LCD and projector images into images for a left eye and images for a right eye is provided;

an observation hole provided with left and right polarization plates on one side of the image box or configured in a left and right sequential shutter type arrangement;

a location sensor including a gyroscope sensor and an acceleration sensor that are provided on one end of the image box and configured to detect the image at a view angle corresponding to a rotation angle of the image box;

an up down rotation plate for rotating the image box upward and downward and a left and right rotation plate for rotating the image box leftward and rightward.

14. The 3D observation device with glassless mode of claim 13, wherein a recognizer for recognizing a bill or a card is provided on one side of the 3D image box.

* * * * *